United States Patent
Sasaki (10) Patent No.: US 6,909,542 B2
(45) Date of Patent: Jun. 21, 2005

(54) LASER MICROSCOPE (75) Inventor: Hiroshi Sasaki, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/093,764

(22) Filed: Mar. 8, 2002

(65) Prior Publication Data
US 2002/0181096 A1 Dec. 5, 2002

(30) Foreign Application Priority Data
Mar. 13, 2001 (JP) .......................... 2001-070805

(51) Int. Cl.[7] .............................................. G02B 21/06
(52) U.S. Cl. ........................................ 359/385; 359/381
(58) Field of Search ................................ 359/363, 381, 359/385, 386, 388, 389; 356/73, 317; 250/205

(56) References Cited

U.S. PATENT DOCUMENTS

| | | | | |
|---|---|---|---|---|
| 5,202,744 A | * | 4/1993 | Louis ........................... | 356/73 |
| 5,329,352 A | * | 7/1994 | Jacobsen ...................... | 356/301 |
| 5,371,624 A | * | 12/1994 | Nagano et al. .............. | 359/389 |
| 5,557,452 A | * | 9/1996 | Harris ......................... | 359/368 |
| 6,486,458 B1 | * | 11/2002 | Schoeppe et al. ........... | 250/205 |

FOREIGN PATENT DOCUMENTS

| | | |
|---|---|---|
| JP | 5-142144 A | 6/1993 |
| JP | 2000-56244 A | 2/2000 |

* cited by examiner

Primary Examiner—Mark A. Robinson
(74) Attorney, Agent, or Firm—Frishauf, Holtz, Goodman & Chick, P.C.

(57) ABSTRACT

A laser microscope according to the present invention comprises a laser light source which generates a laser beam, an optical path split portion which has a plurality of optical path split elements with different characteristics for separating the laser beam irradiated to a sample from the laser light source and light returned from the sample and includes a selection mechanism to switch these optical path split elements on an optical path, an imaging lens to converge light which is returned from the sample and is separated in the optical path split portion, a spectrophotometric detection unit which obtains spectral data of light from the sample, an optical fiber which guides light from the sample imaged by the imaging lens to the spectrophotometric detection unit, wherein an incident end face of the fiber is arranged to a position substantially conjugate to the sample, and a transfer mechanism which moves an incident end face of the optical fiber in a plane orthogonal to an optical axis of light incident on the optical fiber.

11 Claims, 4 Drawing Sheets

LASER MICROSCOPE

CROSS-REFERENCE TO RELATED APPLICATIONS

This application is based upon and claims the benefit of priority from the prior Japanese Patent Application No. 2001-070805, filed Mar. 13, 2001, the entire contents of which are incorporated herein by reference.

BACKGROUND OF THE INVENTION

1. Field of the Invention

The present invention relates to a laser microscope having a spectrophotometric unit which obtains spectral data for light from a sample, especially for fluorescence.

2. Description of the Background Art

Conventionally, there is known a laser microscope which converges a laser beam onto a sample via an objective lens, incorporates light, e.g., fluorescence from the sample into a spectrophotometric unit via an optical fiber, and obtains spectral data for the fluorescence.

This type of laser microscope is disclosed in Jpn. Pat. Appln. KOKAI Publication Nos. 5-142144 and 2000-56244. Especially, Jpn. Pat. Appln. KOKAI Publication No. 2000-56244 discloses a laser scanning microscope. This laser scanning microscope includes a scanning apparatus which comprises a laser light source unit, a dichroic beam splitter, an XY optical scanner, a confocal pinhole, a light detector, etc. The laser scanning microscope includes a spectrophotometric unit such as a diffraction grating connected by an optical fiber. The laser light source unit oscillates light having a plurality of wavelengths. The dichroic beam splitter reflects light from the laser light source and transmits fluorescence from a sample. The laser scanning microscope irradiates a laser beam from the laser light source unit onto a sample via the scanning apparatus by performing two-dimensional scanning. The laser scanning microscope incorporates fluorescence from the sample via the dichroic beam splitter and the optical fiber of the scanning apparatus into the spectrophotometric unit. The laser scanning microscope accumulates spectral data for each scan pixel and finally acquires spectral data for all scan pixels on an image.

On the laser scanning microscope of this kind, however, the laser wavelength to be irradiated onto a sample depends on a fluorescent dye to be used. For this reason, there is provided a plurality of types of dichroic beam splitters according to types of fluorescence from a sample or laser wavelengths to be used. One of a plurality of splitters is appropriately selected so as to be positioned on an optical path according to observation conditions.

When a plurality of dichroic beam splitters is selectively used so as to be positioned on the optical path, however, fluorescence imaged at the end face of an optical fiber may be misaligned due to angle errors of respective dichroic beam splitters. When a dichroic beam splitter on the optical path is changed to another, for example, it is assumed that there occurs a change of 2' (1/30 degrees) of respective dichroic beam splitters before and after the change. In this case, assuming that there is a focal length of 200 mm for a lens to form an image on the optical fiber end, there occurs a deviation of 200×tan (2'×2)=0.233 mm. If the optical fiber is assumed to have a core diameter of 100 μm, the fluorescence may not be completely incident on the end face of the optical fiber due to misalignment of the fluorescence center. In view of these facts, a loss of much incident fluorescence is caused and may hamper the spectral data acquisition.

In order to minimize a fluorescence loss, one possible solution is to enlarge the optical fiber's core diameter approximately up to 1 mm and allow the entire fluorescence to be incident on the end face of the optional fiber despite misalignment of the fluorescence center. However, the use of such optical fiber with a large diameter increases an area of light output toward the spectrophotometric unit. Thus, a light volume loss due to an incident slit inserted to the incident optical path for a spectroscope is increased and may hamper the spectral data acquisition.

BRIEF SUMMARY OF THE INVENTION

It is an object of the present invention to provide a laser microscope capable of acquiring stable spectral data by minimizing a light volume loss.

A laser microscope according to the present invention comprises: a laser light source which generates a laser beam; an optical path split portion which has a plurality of optical path split elements with different characteristics for separating the laser beam irradiated to a sample from the laser light source and light returned from the sample and includes a selection mechanism to switch these optical path split elements on an optical path; an imaging lens to converge light which is returned from the sample and is separated in the optical path split portion; a spectrophotometric detection unit which obtains spectral data of light from the sample; an optical fiber which guides light from the sample imaged by the imaging lens to the spectrophotometric detection unit, wherein an incident end face of the fiber is arranged to a position substantially conjugate to the sample; and a transfer mechanism which moves an incident end face of the optical fiber in a plane orthogonal to an optical axis of light incident on the optical fiber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described in further detail with reference to the accompanying drawings.

Figure 1:
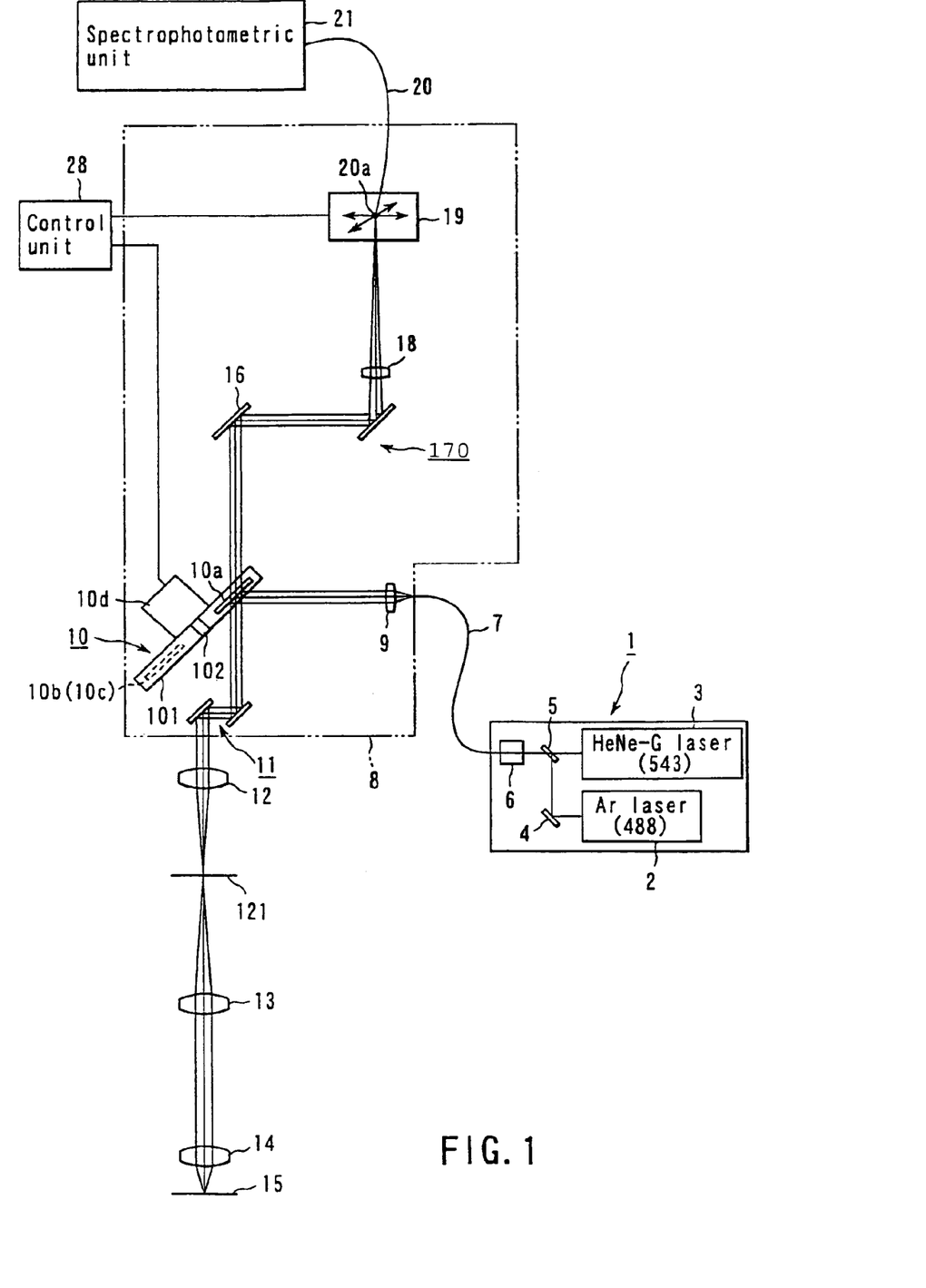
FIG. 1 shows a schematic configuration of a laser microscope according to a first embodiment of the present invention.

FIG. 1 shows a schematic configuration of a laser microscope according to a first embodiment of the present invention. In FIG. 1, a laser unit 1 includes an Ar laser 2 and a green helium-neon (HeNe-G) laser 3 as laser light sources. The Ar laser 2 oscillates light of a 488 nm wavelength. The green helium-neon (HeNe-G) laser 3 oscillates light of a 543 nm wavelength. A mirror 4 is placed ahead of the Ar laser 2. A dichroic mirror 5 is placed ahead of the green helium-neon (HeNe-G) laser 3. The mirror 4 and the dichroic mirror 5 connect laser optical paths for the Ar laser 2 and the green helium-neon (HeNe-G) laser 3, synthesizing light of 488 nm and 543 nm wavelengths. On the laser optical path guided by the dichroic mirror 5, there is provided an acousto-optic tunable filter (hereafter referred to as an AOTF) for selecting the light of the 488 nm or 543 nm wavelength. The laser unit 1 connects with a scanner unit 8 via a single-mode fiber 7.

In the scanner unit 8, a collimating lens 9 is provided at the output end of the single-mode fiber 7. The collimating lens 9 converts a laser beam from the AOTF 6 to parallel rays. A beam splitter unit 10 is arranged on the optical path for parallel rays from the collimating lens 9. The beam splitter unit 10 contains a plurality of beam splitters 10a, 10b, and 10c (not shown) as optical path split elements. The beam splitter unit 10 comprises a rotatable, disk-shaped turret 101. The beam splitters 10a, 10b, and 10c are arranged concentrically with the turret 101. A rotating shaft 102 of a motor 10d is mounted at the center of the turret 101.

The beam splitter 10a is characterized by the 20% reflectance and the 80% transmittance across the entire wavelength of the light. The beam splitter 10b reflects light of the 488 nm wavelength and transmits light of the other wavelengths. The beam splitter 10c reflects light of the 488 nm and 543 nm wavelengths and transmits light of the other wavelengths. The motor 10d rotatively drives to rotate the turret 101 via the rotating shaft 102. This turret operation selects one of beam splitters 10a, 10b, and 10c to be positioned on the optical path for parallel rays from the collimating lens 9.

An XY two-dimensional scanning mirror 11 is arranged on a reflected optical path for the beam splitter unit 10 in the scanner unit 8. The XY two-dimensional scanning mirror 11 two-dimensionally scans a laser beam. This laser beam is converged on the sample 15 via a pupil projection lens 12, a tube lens 13, and an objective lens 14 in the microscope body. Fluorescence generated from the sample 15 returns to the beam splitter unit 10 via the objective lens 14, the tube lens 13, the pupil projection lens 12, and the XY two-dimensional scanning mirror 11.

On the other hand, a reflecting mirror 16 is arranged on a transmitted optical path for the beam splitter unit 10. A reflecting mirror 170 is arranged on a reflected optical path for the reflecting mirror 16. A condensing lens (imaging lens) 18 is arranged on a reflected optical path for the reflecting mirror 170 in the scanner unit 8. An electric transfer mechanism 19 is arranged near an imaging position for the condensing lens 18. The electric transfer mechanism 19 comprises, e.g., a motor-driven XY stage and supports one end face 20a of an optical fiber 20 from a spectrophotometric unit 21. The end face 20a of the optical fiber 20 is supported orthogonally to the optical axis of the light so as to allow light from the condensing lens 18 to enter. The electric transfer mechanism 19 moves the end face 20a of the optical fiber 20 in an XY direction to align the center of the end face 20a to the imaging position of the condensing lens 18. Here, the XY direction is orthogonal to the optical axis of light incident on the optical fiber 20 from the condensing lens 18. The end face 20a of the optical fiber 20 is arranged at a position conjugate to the sample 15.

A control unit 28 is connected to the motor 10d of the beam splitter unit 10 and the electric transfer mechanism 19. The control unit 28 controls revolution of the turret 101 for the beam splitter unit 10. Further, the control unit 28 controls movement of the electric transfer mechanism 19 in the XY direction so that the center of the end face 20a of the optical fiber 20 corresponds to the imaging position caused by the condensing lens 18.

The spectrophotometric unit 21 is configured to obtain spectral data. For example, the unit uses a curved element, a micro mirror array, and a detector, or comprises a combination of an incident slit, a diffraction grating, and a multi-channel detector such as CCD.

The control unit 28 includes a storage portion (not shown) which previously stores correction information about the electric transfer mechanism 19. An angle difference occurs among beam splitters 10a, 10b, and 10c supported on the beam splitter unit 10. The condensing lens 18 produces a different imaging position in the XY direction depending on which of the beam splitters 10a, 10b, and 10c is positioned on the optical axis. In order to correct the deviated imaging position, the electric transfer mechanism 19 is moved in the XY direction based on the correction information about the beam splitters 10a, 10b, and 10c in the beam splitter unit 10. The correction information includes three pieces of information about the beam splitters 10a, 10b, and 10c. The correction information indicates a deviation of an imaging position by means of the condensing lens 18 from the center at the end face 20a of the optical fiber 20 or the amount of driving the electric transfer mechanism 19 to correct the deviation.

Operations of the laser microscope configured as mentioned above will be described below. The following describes how to obtain analysis data for fluorescence generated from the sample 15 due to irradiation of laser beams from the Ar laser 2 and the green helium-neon laser 3 in the laser unit 1.

Under control of the control unit 28, the motor 10d is rotatively driven to select the beam splitter 10a in the beam splitter unit 10 on the optical path.

When the Ar laser 2 oscillates a laser beam of the 488 nm wavelength, the laser beam is reflected on the mirror 4 and the dichroic mirror 5 and enters the AOTF 6. When the green helium-neon laser 3 oscillates a laser beam of the 543 nm wavelength, the laser beam passes through the dichroic mirror 5 and enters the AOTF 6. The laser beams of the 488 nm and 543 nm wavelengths are output from the AOTF 6 and are guided to the scanner unit 8 via the single-mode fiber 7. The laser beams are guided to the scanner unit 8 and pass through the collimating lens 9 to become parallel rays. The laser beams are reflected on the beam splitter 10a in the beam splitter unit 10 and are two-dimensionally scanned on the XY two-dimensional scanning mirror 11. The laser beams converge on the sample 15 via the pupil projection lens 12, the tube lens 13, and the objective lens 14. Fluorescence generated from the sample 15 returns to the beam splitter 10a via the objective lens 14, the tube lens 13, the pupil projection lens 12, and the XY two-dimensional scanning mirror 11.

The fluorescence returned to the beam splitter 10a passes through the beam splitter 10a, is reflected on the reflecting mirror 16, then on the reflecting mirror 170, and converges on the end face 20a of the optical fiber 20 via the condensing lens 18.

Let us consider that the beam splitter unit 10 is operated to change the beam splitter to be used from 10a to 10b or 10c. At this time, the imaging position may be decentered from the end face 20a of the optical fiber 20 due to mutual angle error among the beam splitters 10a, 10b, and 10c as mentioned above. The control unit 28 then provides control to move the electric transfer mechanism 19 based on the above-mentioned correction information. In response to this, the end face 20a of the optical fiber 20 moves in the XY direction to a position corresponding to the beam splitter selected by the beam splitter unit 10. This allows the center of the end face 20a of the optical fiber 20 to correspond to the imaging position of the condensing lens 18 even if any of the beam splitters 10a, 10b, and 10c is used.

The fluorescence incident on the end face 20a of the optical fiber 20 is incorporated into the spectrophotometric unit 21 via the optical fiber 20. The spectrophotometric unit 21 obtains spectral data from the fluorescence. The obtained spectral data coincides with positions on the sample 15 corresponding to scan pixels for the laser beams scanned on the sample 15.

The beam splitter unit 10 is switched in consideration of the following. The beam splitter 10a of the beam splitter unit 10 loses the laser intensity, but causes a small change in spectral characteristics due to its own wavelength. Consequently, the beam splitter 10a is used for accurately obtaining spectral data in a wavelength range extremely approximate to the laser wavelength. The beam splitters 10b and 10c are used when the sufficient laser intensity is needed and it is unnecessary to obtain a range of spectral data adjacent to the laser wavelength.

The first embodiment can allow a converging point for fluorescence from the sample 15 to be always centered on the end face 20a of the optical fiber 20 leading to the spectrophotometric unit 21. This can minimize a loss in the amount of fluorescence due to misalignment between the converging point for fluorescence and the center of the end face 20a of the optical fiber 20. Accordingly, it is possible to always obtain stable spectral data.

A core diameter of the optical fiber 20 will now be described. For example, the following equation is used to find a diffraction diameter D on the end face 20a of the optical fiber 20.

$$D = 1.22 \times \lambda / NA = 1.22 \times 0.5 / 0.006 = 102 (\mu m)$$

In this equation, a value of 0.006 is used for a numerical aperture (NA) of light incident on the optical fiber 20. A value of 500 nm is used for a fluorescence wavelength λ on the shortwave side in the wavelength range for obtaining spectral data. Assuming that the end face 20a of the optical fiber 20 has a core diameter of 100 μm, i.e., substantially equal to the diffraction diameter D in this equation, or smaller, the wavelength of 500 nm or more can provide a confocal effect, especially a confocal effect in the optical axis direction. Spectral data can be obtained at the same focal point.

A single-mode fiber can be used as the optical fiber 20. When the single-mode fiber is used, the numerical aperture (NA) for light incident on the end face 20a of the optical fiber 20 must be adjusted to that of the single-mode fiber. When the single-mode fiber is used, the light emitted to the spectrophotometric unit 21 side becomes parallel rays. Therefore, the need for restricting light by means of a slit normally used in the spectrophotometric unit side is eliminated. Consequently, it is possible to more effectively use light in the spectrophotometric unit 21 side and improve the spectrometry accuracy better than the prior art. Also in this case, confocal spectral data can be obtained.

The above-mentioned first embodiment moves the end face 20a of the optical fiber 20 in the XY direction so that the center of the end face 20a coincides with a converging point for the condensing lens 18. As far as the XY direction is concerned, the end face 20a is moved into a plane orthogonal to the optical axis for light incident on the optical fiber 20, i.e., into a plane orthogonal to the optical axis of the condensing lens 18. However, the present invention is not limited to the configuration described above. It may be preferable to move the condensing lens 18 side in the XY direction by using a transfer mechanism such as the electric transfer mechanism 19.

Figure 2:
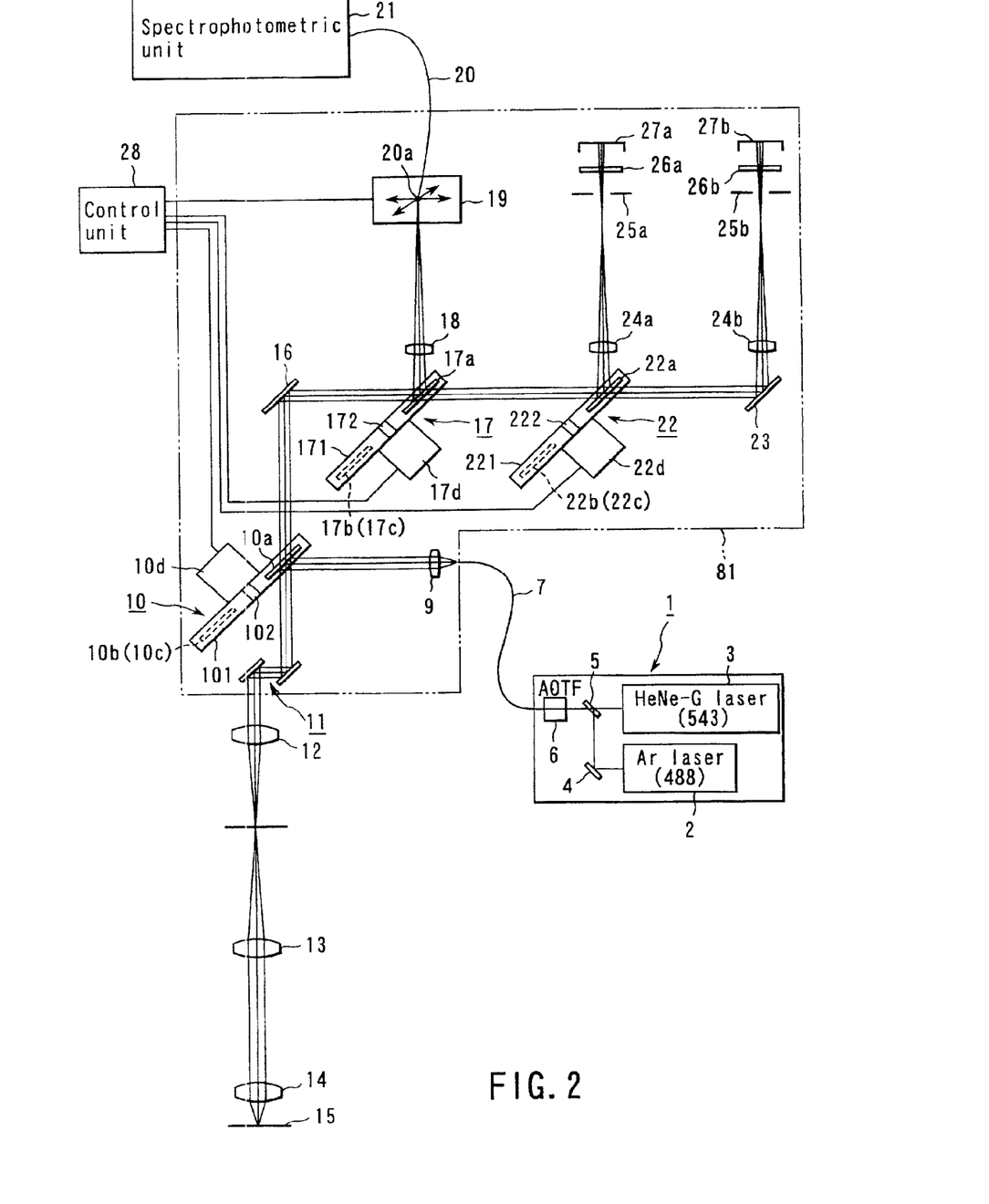
FIG. 2 shows a schematic configuration of a laser microscope according to a second embodiment of the present invention.

FIG. 2 shows a schematic configuration of a laser microscope according to a second embodiment of the present invention. The mutually corresponding parts in FIGS. 2 and 1 are designated by the same reference numerals. The following describes the configuration in FIG. 2 with respect to specifics which differ from FIG. 1.

In FIG. 2, there are provided the reflective member unit 17, a dichroic mirror unit 22, and a reflecting mirror 23 on a reflected optical path for the reflecting mirror 16 in a scanner unit 81.

The reflective member unit 17 supports a mirror 17a, a dichroic mirror 17b, and a parallel-plate glass 17c (not shown). The reflective member unit 17 comprises a rotatable, disk-shaped turret 171. The mirror 17a, the dichroic mirror 17b, and the parallel-plate glass 17c are arranged concentrically with the turret 171. A rotating shaft 172 of a motor 17d is mounted at the center of the turret 171.

The mirror 17a reflects light of all wavelengths. The dichroic mirror 17b is used for restricting a range of wavelengths to obtain spectral data. Alternatively, the dichroic mirror 17b is used when light detectors 27a and 27b (to be described later) simultaneously perform confocal observation of fluorescence having wavelengths other than those requiring acquisition of spectral data. The parallel-plate glass 17c transmits light of all wavelengths. The motor 17d rotatively drives to rotate the turret 171 via the rotating shaft 172. The turret 171 rotates to select one of the mirror 17a, the dichroic mirror 17b, and the parallel-plate glass 17c to be positioned on the optical path for reflected light from the reflecting mirror 16. The condensing lens 18 is arranged on a reflected optical path for the reflective member unit 17 in the scanner unit 81.

The dichroic mirror unit 22 supports a mirror 22a, a dichroic mirror 22b, and a parallel-plate glass 22c (not shown). The dichroic mirror unit 22 comprises a rotatable, disk-shaped turret 221. The mirror 22a, the dichroic mirror 22b, and the parallel-plate glass 22c are arranged concentrically with the turret 221. A rotating shaft 222 of a motor 22d is mounted at the center of the turret 221.

The mirror 22a reflects light of all wavelengths. The dichroic mirror 22b reflects light having a wavelength shorter than 560 nm and transmits light having a wavelength equal to or longer than 560 nm. The parallel-plate glass 22c transmits light of all wavelengths. The motor 22d rotatively drives to rotate the turret 221 via the rotating shaft 222. The turret 221 rotates to select one of the mirror 22a, the dichroic mirror 22b, and the parallel-plate glass 22c to be positioned on the optical path for reflected light from the reflecting mirror 16.

There are provided a confocal lens 24a, a confocal pinhole 25a, a barrier filter 26a, and a light detector 27a on a reflected optical path for the dichroic mirror unit 22 in the scanner unit 81. There are provided a confocal lens 24b, a confocal pinhole 25b, a barrier filter 26b, and a light detector 27b on a reflected optical path for the reflecting mirror 23.

The control unit 28 is connected to the motor 10d of the beam splitter unit 10, the motor 17d of the reflective member unit 17, the motor 22d of the dichroic mirror unit 22, and the electric transfer mechanism 19. The control unit 28 controls revolutions of the turrets 101, 171, and 221 in the beam splitter unit 10, the reflective member unit 17, and the dichroic mirror unit 22.

The control unit 28 includes a storage portion (not shown) which previously stores correction information about the electric transfer mechanism 19. Angle errors occur among the beam splitters 10a, 10b, and 10c supported by the beam splitter unit 10. An angle error occurs between the mirror 17a and the dichroic mirror 17b supported by the reflective member unit 17. Accordingly, the condensing lens 18 causes different imaging positions in the XY direction according to combinations of the beam splitters 10a, 10b, and 10c, and the mirror 17a and the dichroic mirror 17b on each optical axis. To correct this imaging position displacement, the electric transfer mechanism 19 is moved in the XY direction based on the correction information about the beam splitters 10a, 10b, and 10c in the beam splitter unit 10 and the mirror 17a and the dichroic mirror 17b supported in the reflective member unit 17. The correction information indicates a deviation of an imaging position by means of the condensing lens 18 from the center at the end face 20a of the optical fiber 20 or the amount of driving the electric transfer mechanism 19 to correct the deviation.

A sequence of operations of the laser microscope configured as mentioned above will be described below. The following describes how to obtain analysis data for fluorescence generated from the sample 15 due to irradiation of laser beams from the Ar laser 2 and the green helium-neon laser 3 in the laser unit 1.

Under control of the control unit 28, the motors 10d and 17d are rotatively driven to select the beam splitter 10a in the beam splitter unit 10 and the mirror 17a of the reflective member unit 17 on each optical path.

When the Ar laser 2 oscillates a laser beam of the 488 nm wavelength, the laser beam is reflected on the mirror 4 and the dichroic mirror 5 and enters the AOTF 6. When the green helium-neon laser 3 oscillates a laser beam of the 543 nm wavelength, the laser beam passes through the dichroic mirror 5 and enters the AOTF 6. The laser beams of the 488 nm and 543 nm wavelengths are output from the AOTF 6 and are guided to the scanner unit 8 via the single-mode fiber 7. The laser beams are guided to the scanner unit 8 and pass through the collimating lens 9 to become parallel rays. The laser beams are reflected on the beam splitter 10a in the beam splitter unit 10 and are two-dimensionally scanned on the XY two-dimensional scanning mirror 11. The laser beams converge on the sample 15 via the pupil projection lens 12, the tube lens 13, and the objective lens 14. Fluorescence generated from the sample 15 returns to the beam splitter 10a via the objective lens 14, the tube lens 13, the pupil projection lens 12, and the XY two-dimensional scanning mirror 11.

The fluorescence returned to the beam splitter 10a passes through the beam splitter 10a, is reflected on the reflecting mirror 16, then on the mirror 17a in the reflective member unit 17, and converges on the end face 20a of the optical fiber 20 via the condensing lens 18.

Here, let us consider changing the beam splitter 10a and the mirror 17a by performing a selection operation in either or both of the beam splitter unit 10 and the reflective member unit 17. At this time, the imaging position may be decentered from the center of the end face 20a of the optical fiber 20 due to angle errors such as among the beam splitters 10a, 10b, and 10c and between the mirror 17a and the dichroic mirror 17b as mentioned above. When selecting the beam splitter unit 10 and the reflective member unit 17, the control unit 28 controls the electric transfer mechanism 19 to move the end face 20a of the optical fiber 20 in the XY direction. This allows the center of the end face 20a of the optical fiber 20 to correspond to the imaging position of the condensing lens 18. As mentioned above, the control unit 28 uses the storage portion (not shown) to store correction information for allowing the center of the end face 20a of the optical fiber 20 to be coincided with the imaging position of the condensing lens 18. Based on this correction information, the control unit 28 controls to move the electric transfer mechanism 19 in the XY direction, thus moving the end face 20a of the optical fiber 20 to a position corresponding to combinations of selections in the selection for the beam splitter unit 10 and the reflective member unit 17.

The fluorescence incident on the end face 20a of the optical fiber 20 is incorporated into the spectrophotometric unit 21 via the optical fiber 20. The spectrophotometric unit 21 obtains spectral data from the fluorescence. The obtained spectral data coincides with positions on the sample 15 corresponding to scan pixels for the laser beams scanned on the sample 15.

The reflective member unit 17 is switched in consideration of the following. The mirror 17a in the reflective member unit 17 is used for obtaining spectral data for all wavelength ranges. The dichroic mirror 17b is used for restricting a range of wavelengths to obtain spectral data. It is also used when the light detectors 27a and 27b are used to concurrently perform the confocal observation of fluorescence with a wavelength other than that for spectral data acquisition. The parallel-plate glass 17c is used to transmit light of all wavelengths and to perform the confocal observation by using the light detectors 27a and 27b.

Optical paths of the light detectors 27a and 27b are used for detecting the light volume rather than obtaining the spectral data. Namely, the optical paths of the light detectors 27a and 27b are configured similarly to those in the detecting optical system for an ordinary confocal microscope.

In the second embodiment, the control unit 28 moves the electric transfer mechanism 19 in the XY direction according to combinations of selections in the beam splitter unit 10 and the reflective member unit 17. This allows each center of the end face 20a of the optical fiber 20 and the confocal pinhole 31 to correspond to the imaging position caused by the condensing lens 18. The second embodiment rotatively controls the dichroic mirror unit 22 to detect light of desired wavelengths in the light detectors 27a and 27b.

Figure 3:
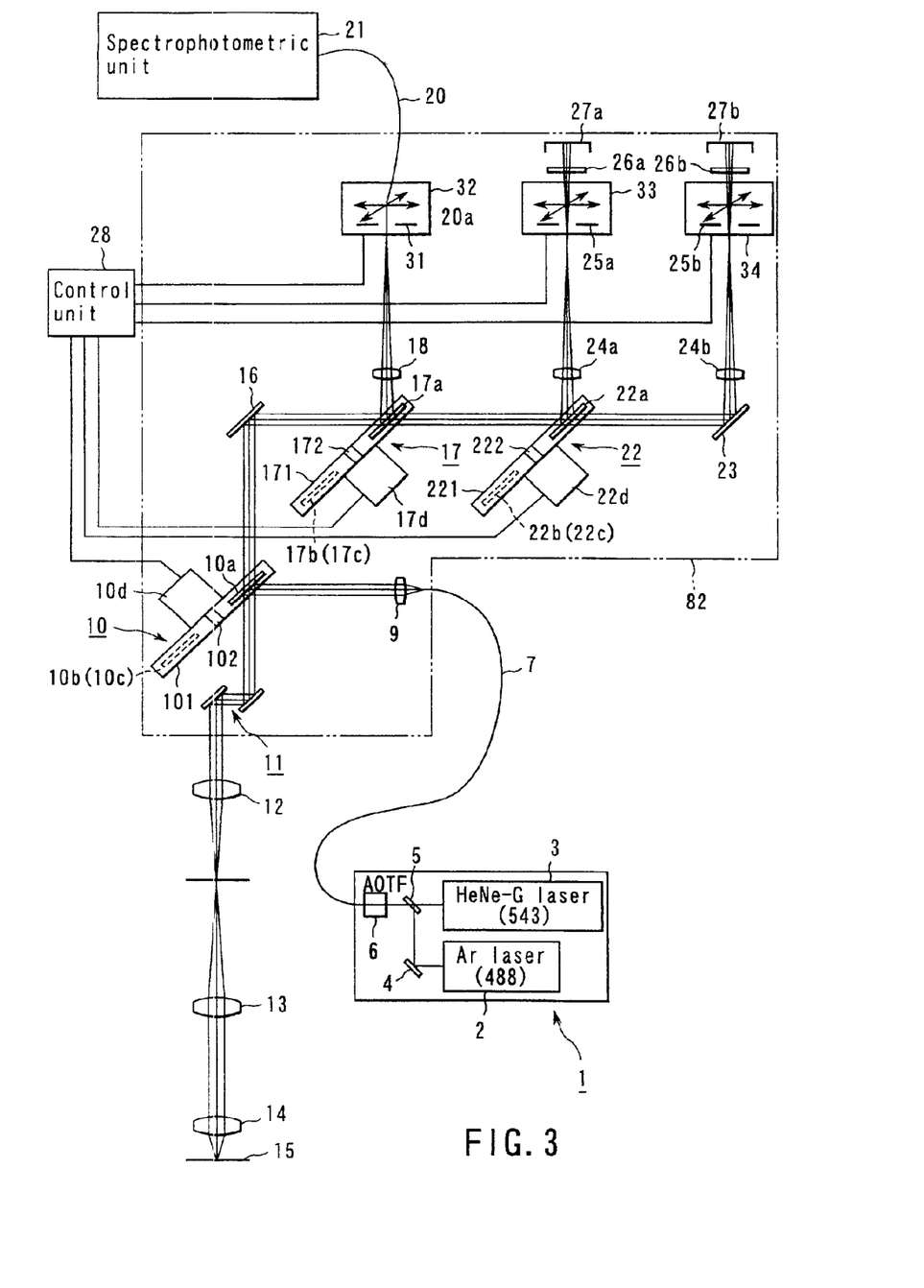
FIG. 3 shows a schematic configuration of a laser microscope according to a third embodiment of the present invention.

FIG. 3 shows a schematic configuration of a laser microscope according to a third embodiment of the present invention. The mutually corresponding parts in FIGS. 3 and 2 are designated by the same reference numerals The following describes the configuration in FIG. 3 and respect to specifics which differ from FIG. 2.

In FIG. 3, the condensing lens 18 is arranged on a reflected optical path for the reflective member unit 17 in the scanner unit 82. An electric transfer mechanism 32 is arranged at an imaging position for the condensing lens 18. Like the electric transfer mechanism 19, the electric transfer mechanism 32 comprises, e.g., a motor-driven XY stage. This mechanism moves one end face 20a of the optical fiber 20 in the XY direction to position the center of the end face 20a to the imaging position for the condensing lens 18. The optical fiber 20 is led from the spectrophotometric unit 21.

A confocal pinhole 31 is arranged at a position which is immediately in front of the end face 20a of the optical fiber 20 and is substantially conjugate to the sample 15. The center of the end face 20a of the optical fiber 20 coincides with the center of the confocal pinhole 31 in a plane orthogonal to the optical axis. In this state, the end face 20a of the optical fiber 20 and the confocal pinhole 31 are mounted integrally with the electric transfer mechanism 32.

The electric transfer mechanism 32 is connected to the control unit 28. The control unit 28 controls movement of the electric transfer mechanism 32 in the XY direction so that the center of the end face 20a of the optical fiber 20 and the center of the confocal pinhole 31 correspond to the imaging position caused by the condensing lens 18. The inside diameter of the confocal pinhole 31 is adjustable by means of a drive mechanism (not shown). When observing the strong light sample 15, an inspector shuts the inside diameter of the confocal pinhole 31 to such a degree that the inside diameter thereof becomes smaller than the diffraction diameter. Accordingly, a confocal effect of fluorescence used for the spectral data acquisition is improved. When observing the weak light sample 15, the inspector opens the inside diameter of the confocal pinhole 31 to such a degree that the inside diameter thereof becomes larger than the diffraction diameter. Accordingly, a light volume of fluorescence to be detected is increased, maintaining a balance between the brightness and a confocal effect.

The confocal pinholes 25a and 25b are arranged in front of the light detectors 27a and 27b for capturing images and are mounted integrally with the electric transfer mechanisms 33 and 34, respectively. Like the above-mentioned electric transfer mechanism 32, the electric transfer mechanisms 33 and 34 comprise, e.g., motor-driven XY stages and are movable in the XY direction. The electric transfer mechanisms 33 and 34 are connected to the control unit 28. The control unit 28 controls movement of the electric transfer mechanisms 33 and 34 in the XY direction so that the centers of the confocal pinholes 25a and 25b each correspond to imaging positions caused by the confocal lenses 24a and 24b, respectively.

Like in the second embodiment, the correction information for the electric transfer mechanism 32 is used for adjusting the confocal pinhole 31 to an imaging position of the condensing lens 18 which deviates according to a combination of selections in the beam splitter unit 10 and the reflective member unit 17.

The correction information for the electric transfer mechanism 33 is used for adjusting the confocal pinhole 25a to an imaging position of the confocal lens 24a which deviates according to a combination of selections in the beam splitter unit 10 and the dichroic mirror unit 22.

The correction information for the electric transfer mechanism 34 is used for adjusting the confocal pinhole 24b to an imaging position of the confocal lens 24b which deviates according to a selection state of the beam splitter unit 10.

As mentioned in the above-mentioned embodiment, each correction information is stored in the storage portion (not shown) of the control unit 28. Each correction information indicates a deviation between the imaging position and the confocal pinhole or drive amounts for driving the electric transfer mechanisms 32, 33, and 34 and correcting the deviation.

In the third embodiment, the control unit 28 moves the electric transfer mechanism 32 in the XY direction according to combinations of selections in the beam splitter unit 10 and the reflective member unit 17. This allow each center of the end face 20a of the optical fiber 20 and the confocal pinhole 31 to correspond to the imaging position caused by the condensing lens 18. Further, the control unit 28 moves the electric transfer mechanism 33 in the XY direction according to combinations of selections in the beam splitter unit 10 and the dichroic mirror unit 22. The control unit 28 also moves the electric transfer mechanism 34 in the XY direction according to selections in the beam splitter unit 10. This can allow each center of the confocal pinholes 25a and 25b to correspond to the imaging positions caused by the confocal lenses 24a and 24b, respectively.

According to the third embodiment, the electric transfer mechanism 32 can be commonly used to control centering of the end face 20a of the optical fiber 20 and the confocal pinhole 31 corresponding to the imaging position caused by the condensing lens 18 at a time. This simplifies the configuration and decreases the number of parts, providing an inexpensive laser microscope. Since a confocal effect is available in the optical axis direction, confocal spectral data can be obtained. Providing the confocal pinhole 31 with an adjustable inside diameter makes it possible to easily maintain a balance between the brightness and a confocal effect. The same mechanism can be used to configure the electric transfer mechanism 32 for controlling the end face 20a of the optical fiber 20 and the confocal pinhole 31 and the electric transfer mechanisms 33 and 34 for controlling the confocal pinholes 25a and 25b. It is also possible to use the same control system for controlling these mechanisms. This simplifies the configuration and decreases the number of parts, providing an inexpensive laser microscope.

Figure 4:
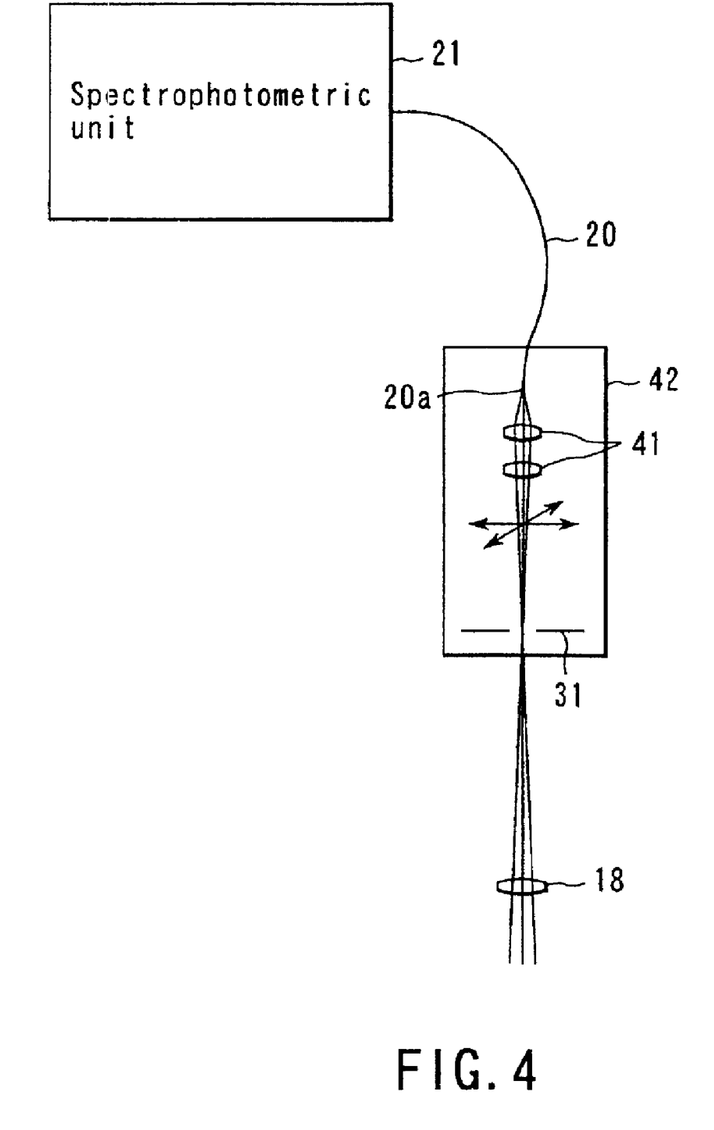
FIG. 4 shows a schematic configuration of main part of a laser microscope according to a fourth embodiment of the present invention.

FIG. 4 shows a schematic configuration of main part of a laser microscope according to the fourth embodiment of the present invention. The mutually corresponding parts in FIGS. 4 and 3 are designated by the same reference numerals. FIG. 4 shows part of the optical path from the condensing lens 18 to the spectrophotometric unit 21 in FIG. 3.

In FIG. 4, a relay optical system 41 is provided between the confocal pinhole 31 and the end face 20a of the optical fiber 20. The relay optical system 41 projects the confocal pinhole 31 onto the end face 20a of the optical fiber 20. The end face 20a of the optical fiber 20, the relay optical system 41, and the confocal pinhole 31 are mounted integrally with a common electric transfer mechanism 42. Like the above-mentioned electric transfer mechanism 19, the electric transfer mechanism 42 comprises, e.g., a motor-driven XY stage and is movable in the XY direction.

The electric transfer mechanism 42 is connected to the control unit 28. The control unit 28 moves the electric transfer mechanism 42 in the XY direction based on the correction information according to combinations of selections in the beam splitter unit 10 and the reflective member unit 17. This positions the center of the end face 20a of the optical fiber 20 to the imaging position of the condensing lens 18.

According to the fourth embodiment, the end face 20a of the optical fiber 20 can be arranged away from the confocal pinhole 31 because the relay optical system 41 is provided therebetween. This is useful when the end face 20a of the optical fiber 20 cannot be arranged near the confocal pinhole 31. Consequently, it is possible to improve the degree of freedom for designing the laser microscope. In this case, light from the condensing lens 18 is converged on the end face 20a of the optical fiber 20 via the confocal pinhole 31 and the relay optical system 41. When the condensing lens 18 is also used as a confocal lens for image capturing, the relay optical system 41 can be used as the basis of an optical design suited for characteristics of the optical fiber 20 to be used. It is possible to easily provide an optimal optical design for characteristics of the optical fiber 20.

While the above-mentioned embodiments use the control unit 28 to control movement of the electric transfer mechanism, the present invention is not limited to automatic control by a control unit. For example, an inspector may manually correct a deviation between the imaging position of the condensing lens 18 and the center of the end face 20a of the optical fiber 20 by using a control unit according to angle errors among the beam splitters 10a, 10b, and 10c maintained in the beam splitter unit 10 or combinations of selections in the beam splitter unit 10 and the reflective member unit 17.

As mentioned above, the present invention can provide a laser microscope capable of acquiring stable spectral data by minimizing a light volume loss.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser microscope comprising:
   a laser light source which generates a laser beam;
   an optical path split portion which includes a plurality of optical path split elements with different characteristics for separating said laser beam irradiated to a sample from said laser light source and light returned from said sample, and a selection mechanism to switch the optical path split elements on an optical path;
   an imaging lens to converge light which is returned from said sample and separated in said optical path split portion;
   a spectrophotometric detection unit which obtains spectral data of said light from said sample;
   an optical fiber which guides said light from said sample imaged by said imaging lens to said spectrophotometric detection unit, wherein an incident end face of said fiber is arranged to a position substantially conjugate to said sample; and
   a transfer mechanism which moves an incident end face of said optical fiber in a plane orthogonal to an optical axis of light incident on said optical fiber,
   wherein a core diameter of said optical fiber is substantially equal to or smaller than a diffraction diameter $(1.22 \times \lambda/NA)$ determined by a numerical aperture NA of light incident on the incident end face of said optical fiber and a wavelength $\lambda$.

2. The laser microscope according to claim 1, further comprising a control portion which controls said transfer mechanism, wherein said control portion operates in conjunction with a changeover of said optical path split portion and controls said transfer mechanism so that a center of the incident end face of said optical fiber corresponds to an imaging position of said imaging lens.

3. The laser microscope according to claim 2, wherein said control portion previously stores correction information for causing the center position of the incident end face of said optical fiber with a possibility of deviation due to the changeover by said optical path split portion to correspond to an imaging position of said imaging lens, and controls said transfer mechanism based on said correction information in interlock with the changeover by said optical path split portion.

4. The laser microscope according to claim 2, further comprising a confocal pinhole arranged immediately in front of the incident end face of said optical fiber, wherein said transfer mechanism moves the incident end face of said optical fiber and said confocal pinhole integrally.

5. The laser microscope according to claim 4, further comprising a relay optical system arranged between the incident end face of said optical fiber and said confocal pinhole, wherein said transfer mechanism integrally moves the incident end face of said optical fiber, said relay optical system, and said confocal pinhole.

6. The laser microscope according to claim 1, wherein the optical fiber is a single-mode fiber.

7. A laser microscope comprising:
a laser light source which generates a laser beam;
a beam splitter unit which includes a plurality of optical path split elements having different characteristics for separating said laser beam irradiated to a sample from said laser light source and light from said sample, and which separates said laser beam and said light from said sample by changing the optical path split elements on an optical path;
an imaging lens to converge light which is returned from said sample and separated in said beam splitter unit;
a spectrophotometric detection unit which obtains spectral data of said light from said sample;
an optical fiber which guides said light from said sample imaged by said imaging lens to said spectrophotometric detection unit, wherein an incident end face of said fiber is arranged to a position substantially conjugate to said sample;
a transfer mechanism which moves an incident end face of said optical fiber in a plane orthogonal to an optical axis of said imaging lens; and
a control portion which controls said transfer mechanism in conjunction with a changeover of said beam splitter unit so as to allow the incident end face of said optical fiber to correspond to an imaging position of said imaging lens,
wherein a core diameter of said optical fiber is substantially equal to or smaller than a diffraction diameter (1.22×λ/NA) determined by a numerical aperture NA of light incident on the incident end face of said optical fiber and a wavelength λ.

8. The laser microscope according to claim, 7 further comprising;
a detector which detects said light from said sample; and
a reflective member unit which divides light irradiated from said beam splitter unit and returned from said sample between said spectrophotometric detection unit and said detector,
wherein said control portion controls said transfer mechanism in conjunction with a changeover by said beam splitter unit and a changeover by said reflective member unit.

9. The laser microscope according to claim 7, wherein the optical fiber is a single-mode fiber.

10. A laser microscope comprising:
a laser light source which generates a laser beam;
an optical path split portion which switches a plurality of optical path split elements with different characteristics for separating said laser beam irradiated to a sample from said laser light source and light returned from said sample;
an imaging lens which converges light which is returned from said sample and separated in said optical path split portion;
a detection unit which detects said light, from said sample;
an optical fiber which guides said light from said sample imaged by said imaging lens to said detection unit, wherein an incident end face of said fiber is arranged to a position substantially conjugate to said sample; and
a positioning mechanism which positions a center of the incident end face of said optical fiber to an optical axis of light incident on said incident end face in conjunction with the switching of the optical path split elements by the optical path split portion,
wherein a core diameter of said optical fiber is substantially equal to or smaller than a diffraction diameter (1.22×λ/NA) determined by a numerical aperture NA of light incident on the incident end face of said optical fiber and a wavelength λ.

11. The laser microscope according to claim 10, wherein the optical fiber is a single-mode fiber.

* * * * *